FOOD DISPENSING APPARATUS

Original Filed Aug. 9, 1963 4 Sheets-Sheet 1

INVENTOR.
William W. Cease
BY.
Christel & Bean
ATTORNEYS.

FOOD DISPENSING APPARATUS

Original Filed Aug. 9, 1963 4 Sheets-Sheet 2

INVENTOR.
William W. Cease
BY.
Christel & Bean
ATTORNEYS.

FOOD DISPENSING APPARATUS

Original Filed Aug. 9, 1963 4 Sheets-Sheet 3

INVENTOR.
William W. Cease
BY
Christel & Bean
ATTORNEYS

FOOD DISPENSING APPARATUS

Original Filed Aug. 9, 1963 4 Sheets-Sheet 4

INVENTOR.
William W. Cease
BY.
Christel & Bean
ATTORNEYS.

United States Patent Office

Re. 26,479
Reissued Oct. 22, 1968

26,479
FOOD DISPENSING APPARATUS

William W. Cease, Fredonia, N.Y., assignor to Cease Central, Inc., Dunkirk, N.Y.

Original No. 3,189,217, dated June 15, 1965, Ser. No. 301,025, Aug. 9, 1963. Application for reissue June 12, 1967, Ser. No. 651,638

16 Claims. (Cl. 221—69)

Matter enclosed in heavy brackets [ ] appears in the original patent but forms no part of this reissue specification; matter printed in italics indicates the additions made by reissue.

*ABSTRACT OF THE DISCLOSURE*

*Apparatus for dispensing food packages from a stack of packages wherein the stack is supported by the lowermost package resting upon a pair of spaced rails. Vertically movable members engage the package above the lowermost package and raise the stack from the lowermost package whereby the latter may be dispensed and the vertically movable members move downwardly to again deposit the stack upon the spaced rails. The vertically movable members are gravity biased to withdrawn positions and are movable inwardly to engage a package and thus lift the stack by cam means operable upon upward movement of the vertically movable members.*

This invention relates to apparatus for dispensing food and more particularly to handling composite stacks of plates or food packages containing complete dinners or other food items and dispensing individual service plates or food packages therefrom.

Speaking generally, the present invention provides a novel means for maintaining a vertical stack of plates or food packages containing food items in accurate vertical alignment in such manner as to prevent contact of food on a plate with the underside of a superjacent plate, and with the food completely enclosed up to the time of final dispensing. In one form of the invention ring or collar members are provided which intervene between the plates and cooperate with the plates to form a composite stack wherein each plate is securely supported with the food thereon out of contact with other plates or other agencies and wherein the food on each plate is completely enclosed to maintain proper temperature and fresh and palatable condition and appearance of the food up to the time when a plate is removed from the present apparatus for service to a consumer. These food packages are disclosed more fully in my [copending] patent application, Serial No. 287,121 filed June 11, 1963, *now Patent No. 3,305,126, dated Feb. 21, 1967*, and the spacing members referred to above are sometimes referred to herein as stack bands.

As further disclosed in my above identified [copending] application, the stack bands may be replaced by cover members which likewise interfit between vertically adjacent serving plates. In either of these embodiments the present apparatus dispenses the service plate and disposes of the stack band or cover within the apparatus.

The vertical series of alternate plates and stack bands or covers cooperate to provide a self-aligning vertical stack without external aligning or guiding means and the relationship of the plates and bands or covers is such that the bands or covers are readily disposed of in the final dispensing of the plate from the bottom of a stack.

As plates are dispensed from the bottom of the stack the stack lowers and the height thereof, as determined by the number of remaining units, is indefinite. The supply of units may be replenished at any time and in any desired amount by merely placing additional units on top of the stack in properly aligned position. This replenishment may be effected manually, or automatic or semi-automatic means may be provided for adding additional units to the top of a stack.

The present dispensing apparatus is further adapted to deliver, from a stack, individual food packages of the type shown in FIGS. 1, 2 and 3 of my aforesaid copending application, which packages contemplate an inverting step following dispensing from a stack and prior to final delivery. In this embodiment the package components which are not employed in the ultimate service of the food may be disposed of in the inverting apparatus, for instance, as shown in my prior Patent No. 3,241,709 dated March 22, 1966.

While several embodiments of the apparatus of the present invention are illustrated in the drawing and several forms of apparatus and general methods of practicing the present invention are described in detail in the following specification, it is to be understood that such embodiments are merely by way of example and that the scope of the present invention is not limited to such embodiments nor otherwise than as defined in the appended claims.

Figure 1:
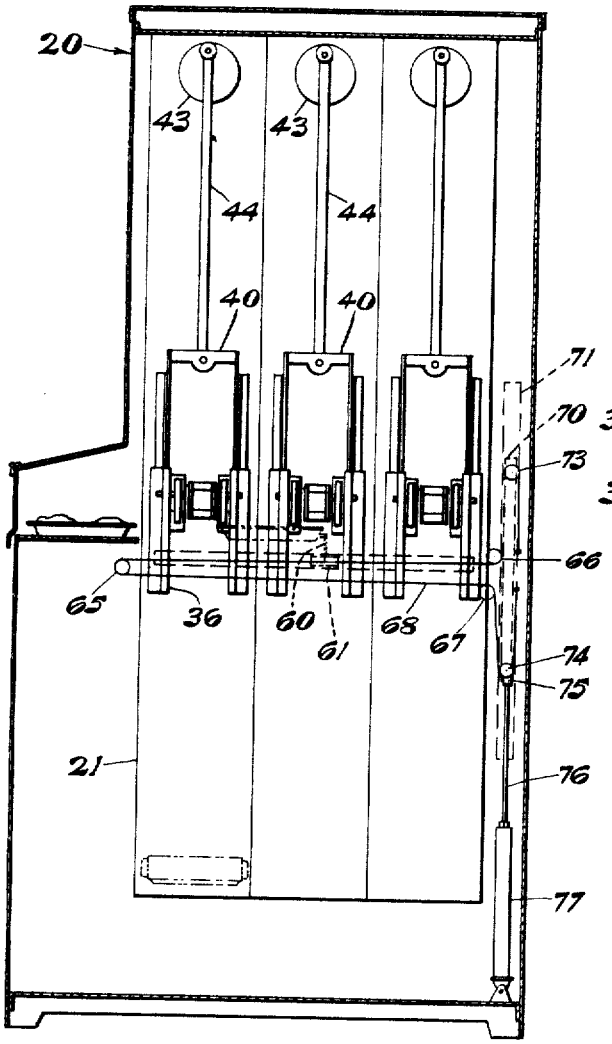
FIG. 1 is vertical cross sectional view of one form of the dispensing apparatus of the present invention taken from front to rear.
Figure 2:
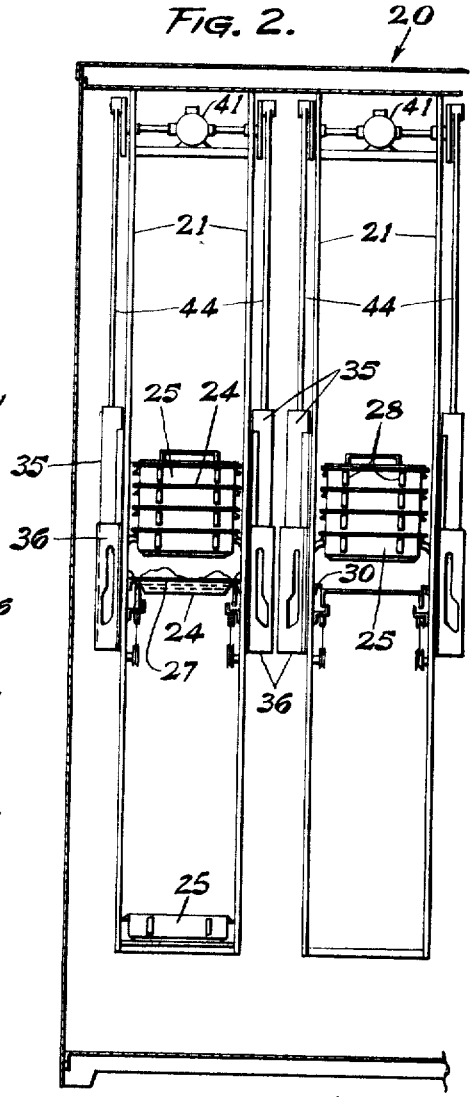
FIG. 2 is a vertical cross sectional view of the apparatus of FIG. 1 taken on a lateral plane.

Like characters of reference denote like parts throughout the several figures of the drawings. FIGS. 1 and 2 are general views showing one form of a dispensing cabinet embodying the principles of the present invention wherein there are three stacks of tiers of food packages from front to rear. Considered laterally, a single cabinet may contain one or more dispensing sections. FIG. 2 shows two such sections.

In FIGS. 1 and 2 the numeral 20 designates generally a cabinet enclosure having, for each frontal dispensing station, a pair of vertically extending spaced wall members 21. In the present instance each pair of such wall members supports the entire supporting and dispensing mechanism for three tiers or stacks of packages as indicated in FIG. 1.

A description of the supporting and dispensing mechanism for one such tier or stack will, in general, suffice for all. In FIGS. 1 through 6 the packages being dispensed comprise stacks consisting of a series of plates 24 having intervening stack bands 25 which fit between each adjacent pair of plates 24. Each stack band 25 comprises an open frame which nests at its lower edge with the upper portion of an underlying plate and at its upper edge with the lower portion of an overlying plate.

This general food package construction is shown more fully in my copending patent application, Serial No. 287,121 filed June 11, 1963 and, as there shown, the stack bands may be replaced with cover members which likewise interfit between adjacent serving plates. Furthermore, the present dispensing mechanism may be employed in delivering individual food packages of a type wherein each package is inverted just prior to final delivery from the apparatus.

Accordingly, inverting apparatus such as that shown in my copending patent application, Serial No. 259,148, filed February 18, 1963, may be positioned to receive packages delivered from the present apparatus. Packages in which such inversion is contemplated are also shown in my above patent application, Serial No. 287,121, filed June 11, 1963.

The plates 24 have the usual marginal flange portions 27 and each band 25 has a pair of spaced lateral flanges 28 at each side thereof for employment in the operation of the present dispensing mechanism, as will presently appear. A pair of horizontal angle members 30 secured to the facing surfaces of walls 21 form ledges which receive and support serving plates 24 at the elevation at which they are ultimately moved forwardly to deliver the same from the present apparatus, either for final serving or, as indicated above, for inversion in the case of food packages involving a container and a superposed inverted serving plate.

Figure 7:
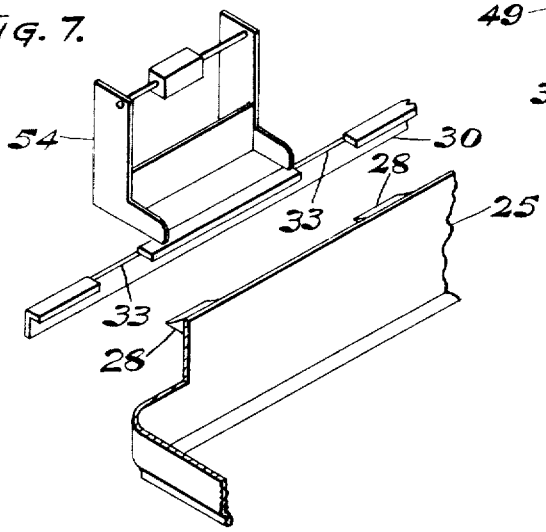
FIG. 7 is a skeletonized perspective view of a portion of the hold-down foot and plate supporting ledge.

While the vertical attaching portions of the angle members are generally continuous from front to rear of the walls 21, the horizontal flanges which form the plate supporting ledges are discontinuous as indicated in FIG. 7. A pair of notches 33 is provided in each angle member 30 at each of the three tiers or stacks in registry with the spaced flanges 28 of bands 25 whereby the bands may pass freely downwardly past the members 30 while the flanges 27 of plates 24 are arrested by the angle members upon downward movements of the plates.

Figure 8:
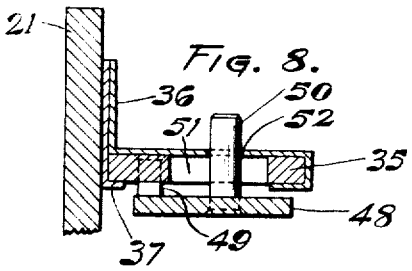
FIG. 8 is a cross sectional view on the line VIII—VIII of FIG. 5.

The means for supporting a stack of food packages in position to dispense the packages individually from the bottom of the stack and for actually dispensing the same will now be described. In the embodiment of FIGS. 1 through 10 the numeral 35 designates pairs of bars which extend vertically at the outer sides of the walls 21, such bars being in registry with the notches 33 of angle members 30 and retained and guided for vertical movement, as best shown in FIG. 8, by retaining flange members 36 and 37 which are fixed to the outsides of the walls 21.

The two bars 35 at the outside of each wall 21 are rigidly connected at their upper ends to a crossbar 40. A motor and reducing gear unit or a slow speed motor 41 is mounted in the upper end of casing 20 above each stack and an output shaft 42 extends laterally in opposite directions therefrom. Crank wheels 43 at opposite ends of shaft 42 and connecting rods 44 provide vertical reciprocation of bars 35 and a single revolution clutch or a suitable electrical control switch arrangement is provided whereby, when actuation of motor 41 is initiated, a single cycle of operation involving a lowering and raising movement of the bars 35 is effected.

Stack supporting dogs 48 are pivoted at their lower ends to the several bars 35, their upper ends being adapted to project inwardly through slots in the walls 21 to engage the flanges 28 of bands 25. A full dispensing cycle will be described in greater detail in conjunction with the description of the embodiment illustrated in FIGS. 11 through 15.

Figure 3:
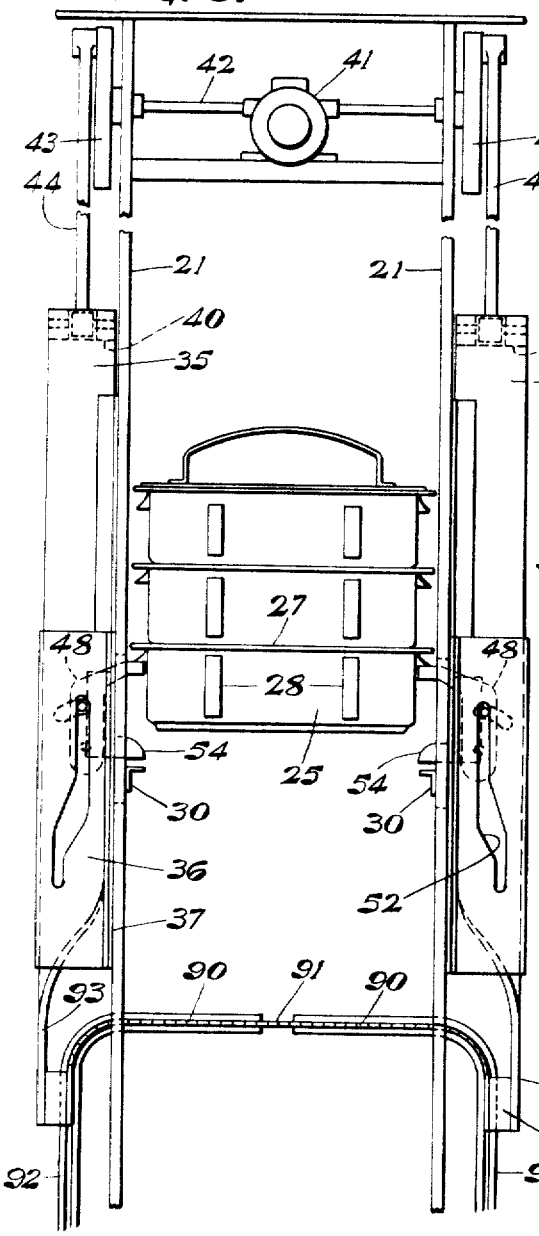
FIG. 3 is a fragmentary cross-sectional view taken similarly to FIG. 2 but on an enlarged scale and showing particularly the dispensing portion of the apparatus of FIGS. 1 and 2.
Figure 4:
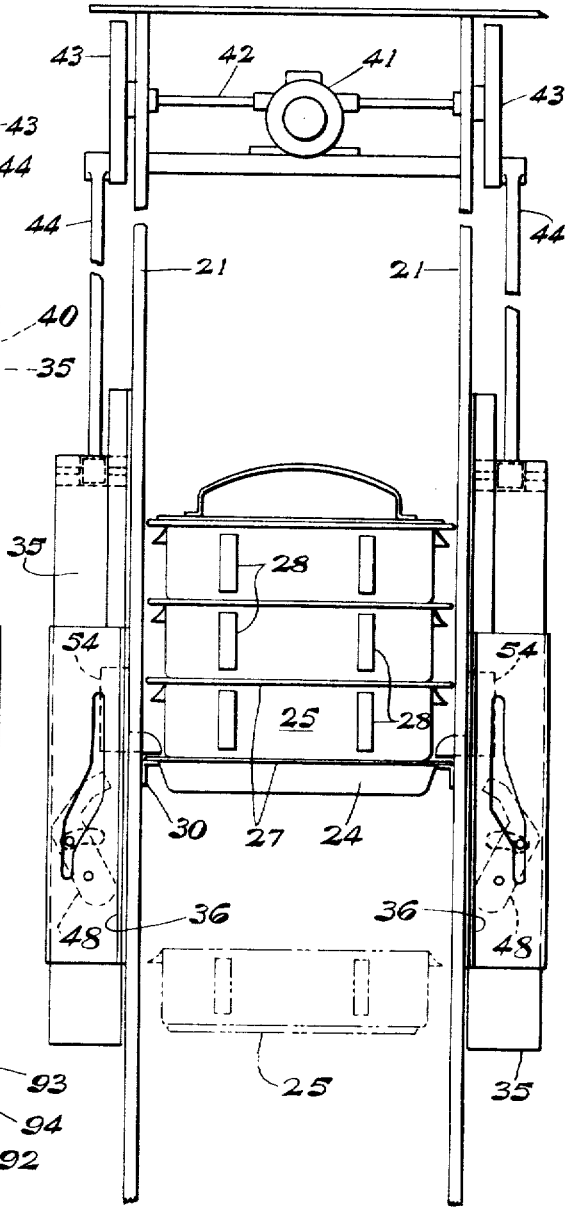
FIG. 4 is a view similar to FIG. 3 but with the parts in a different position in a dispensing cycle.
Figure 5:
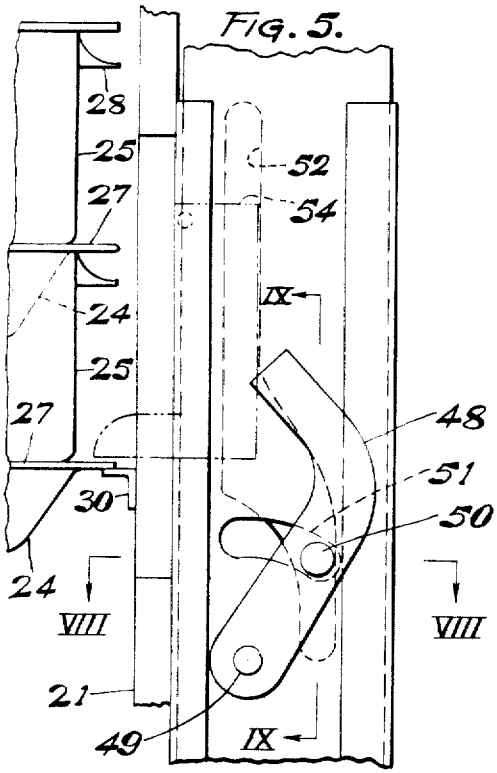
FIG. 5 is a fragmentary elevational view of the front left hand feed dog mechanism of FIG. 4 viewed from the opposite side.
Figure 6:
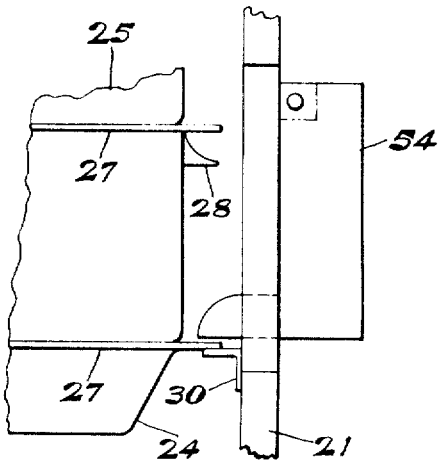
FIG. 6 is a view similar to FIG. 5 but with parts removed to illustrate the hold-down foot.
Figure 9:
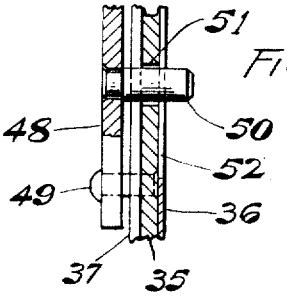
FIG. 9 is a cross sectional view on the line IX—IX of FIG. 5.

In FIGS. 3, 4 and 5 the pivotal connection between each dog 48 and its supporting bar 35 is designated 49 and a pin 50 extends from the dog 48 through a clearance slot 51 in bar 35 and into a cam slot 52 formed in each of the retaining flange members 36. In addition to the foregoing, the dispensing mechanism includes hold-down members 54, one of which is shown in detail in FIG. 7.

The hold-down members 54 are pivoted at their upper ends to the walls 21 and have toe formations at their lower ends which project through slots in walls 21. The hold-down members normally assume the position illustrated in FIGS. 5 and 6 under the force of gravity but are freely swingable in an outward direction when plate flanges move downwardly against the rounded or inclined upper surfaces of the toe formations thereof.

Referring now to FIGS. 11 through 15, the dispensing mechanism there illustrated is the same in principle as that of FIGS. 1 through 9 but the parts are differently proportioned to suit different dimensional requirements. In particular, the dogs in FIGS. 11 through 15 are substantially higher than those of the previous embodiment to clear the guide means for the ejecting mechanism. For convenience in identification, the individual parts of the mechanism in FIGS. 11 through 15 bear identifying numerals 100 greater than the reference numerals of corresponding parts in the previous embodiment.

Thus, in FIGS. 11 through 15, the plates and bands are designated 124 and 125, their supporting flanges 127 and 128, the interior wall members 121, ledge-forming angle members 130, vertical bar 135 (not shown in FIGS. 11 through 15), dog 148, dog pivot 149, pin 150, cam slot 152 and pivoted hold-down member 154. Further, in FIGS. 11 through 15 the numerals 158 and 159 designate guide rails for horizontal ejection means which will be described later therein.

Figure 11:
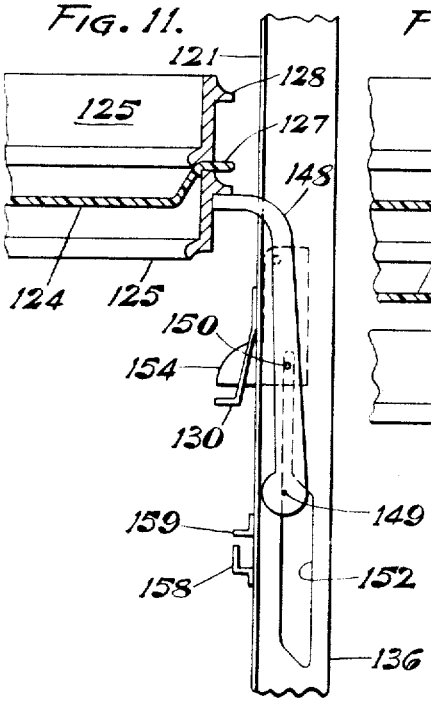
FIG. 11 is a fragmentary elevational view of a supporting and lowering dog mechanism of a modified form.

FIG. 11 shows the rest position of the parts wherein the bars 135 are in an upper most position, corresponding to the top dead center crank wheel position of FIG. 3. The dogs 148 are held in an upright position by engagement of their pins 150 in the upper narrow portions of cam slots 152 and thus the dogs engage beneath flanges 128 of the lowermost band 125 of a stack and the entire stack is thus supported on the dogs 148.

Figure 12:
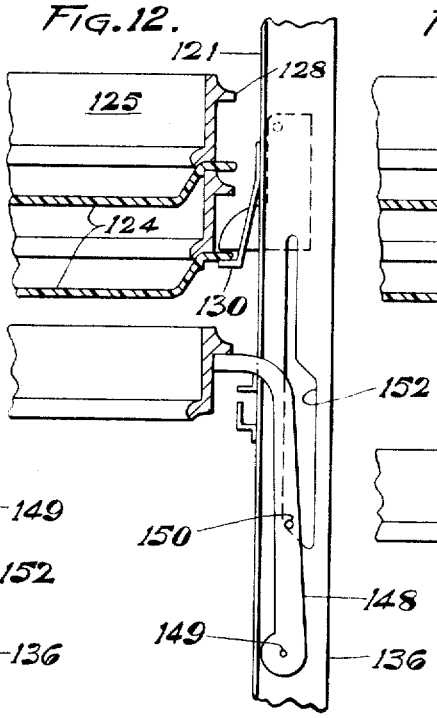
FIG. 12 through 15 are views similar to FIG. 11 but showing a series of successive positions of the parts throughout a cycle of operation.

During the first part of a complete cycle of operation which comprises a downward and an upward movement of bars 135 the dogs 148 are lowered and until they reach the position of FIG. 12 the dogs remain upright with their upper lateral portions in projected position, both by reason of gravity acting on the dogs 148 and by reason of the weight of a stack or even a single band 125 thereon. During this downward movement the flanges 128 of the band 125 which is directly supported by the dogs 148 pass freely downwardly past the rails 130 by reason of the notches therein, as shown in FIG. 7 of the previous embodiment. However, the flange portions of the lowermost plate 124 (the plate immediately above this lowermost band 125) come to rest on the rails 130 as clearly shown in FIG. 12. At this time the entire stack is supported on the rails 130 excepting the lowermost band which moves downwardly with dogs 148 as shown in FIG. 12.

Figure 13:
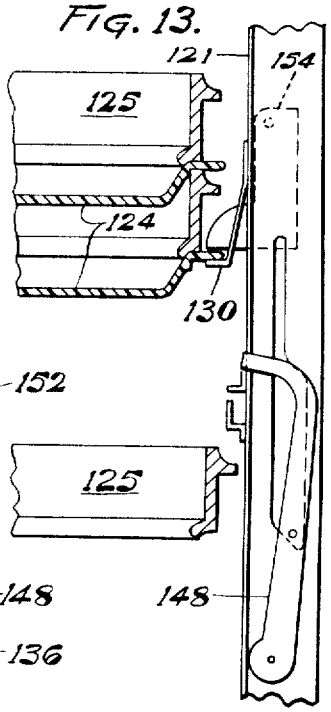

During the remainder of the downward movement of bars 135, from the FIG. 12 position to the FIG. 13 position the pins 150 of the dogs 148 engage the lower inclined ends of cam slots 152 whereby the dogs 148 are pivotally retracted as shown in FIG. 13 and the band 125 is shown falling to a receiving space in cabinet 20 beneath the dispensing mechanism.

Figure 14:
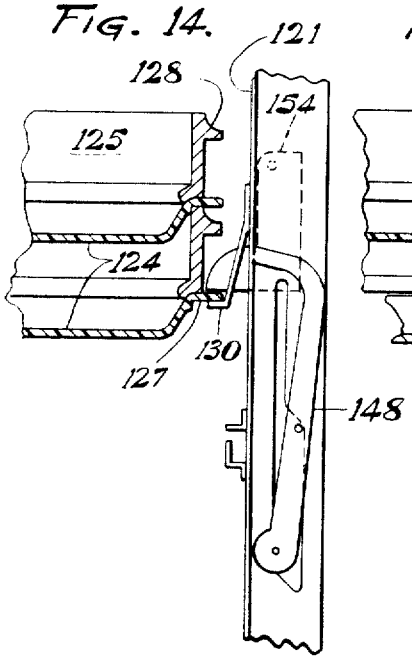
Figure 15:
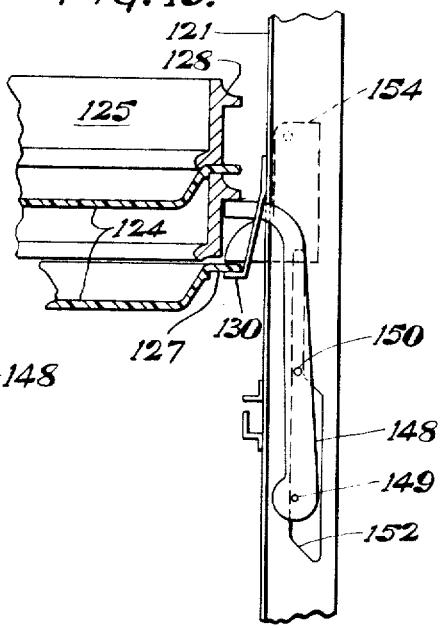

The bars 135 now move upwardly and the dogs 148 remain retracted due to over-center gravity action thereon and also due to any friction in the pivots 149, until the pins 150 reach the point shown in FIG. 14 where the upper offset ends of the dogs 148 have moved upwardly beyond the flanges of the plate 124 on the rails 130, whereupon cam slots 152 act upon pins 150 to again project the dogs as shown in FIG. 15 so that upon continued upward movement they engage the flanges 128 of band 125 which is next above the plate on rails 130. This band and the entire superposed stack is then lifted by dogs 148 from the plate 124 on rails 130, returning the stack to the rest position shown in FIG. 11.

During movement of the stack from the position of FIG. 15 to the position of FIG. 11 the lowermost band is forcibly raised from the plate on rails 130, the plate being positively prevented from raising by the hold-down members 154. Thus the bands are readily disassembled from underlying plates even when the bands (or cover members) are snapped into or onto cooperating formations on the plate, as shown for instance in my aforesaid copending application, Ser. No. 287,121.

The means for ejecting plates forwardly from the machines after they have been deposited upon the rails 30 or 130 and after the remainder of the stack has been raised clear thereof is illustrated in FIG. 1 wherein the numeral 60 designates an ejector member which extends across the space beneath a stack and is supported at its opposite side by brackets 61 which are mounted for fore and aft sliding movement in guide rails corresponding to those designated 158 and 159 in FIG. 11, which attached to the interior surfaces of the wall 21 or 121, as the case may be.

The ejector member 60 is disposed at such elevation that upon forward movement thereof from a rearmost position it will engage against a plate or bowl located on the rails 30 or 130 in any of the three tandem stations contemplated in the embodiment of FIG. 1, for instance.

The means for actuating the ejector member through the side brackets 61 comprises a differential pulley mechanism, illustrated in FIG. 1. A forward stationary pulley 65 and two rear stationary pulleys 66 and 67 have extending thereabout, as shown in FIG. 1, a cable means 68 in which the bracket member 61 is inserted as shown. A pair of bars 70 are mounted for vertical sliding movement in guides 71 and pulleys 73 and 74 are carried by each bar 70. At their lower ends bars 70 are connected by a cross bar 75 and the piston rod 76 of an air cylinder 77 connects with and reciprocates cross bar 75 vertically. Thus a relatively short stroke of piston rod 76 produces sufficient longitudinal movement of brackets 61 to traverse the distance from front to rear of casing 20 and thus serve the three stacks illustrated in FIG. 1.

It is preferred that the space in the lower portion of cabinet 20 which receives bands or cover members as they are released from the dispensing mechanism be closed at all times excepting when bands or covers are actually being deposited therein. This is particularly desirable since the interior of the cabinet may be either heated or cooled in accordance with the types of foods being dispensed and the wall portions in many instances will be insulated to render the heating or cooling more efficient.

FIG. 3 shows a closure for such lower portion comprising a pair of flexible metal curtain members 90 which meet as at 91 to close the lower portion of the cabinet. The curtain members 90 extend laterally into guides 92 so that they may be slid open, the outer portions of the curtain closures 90 moving downwardly.

The bars 35 which operate the dispensing mechanism may be extended downwardly as at 93 and connected to portions of the curtain closures 90, whereby downward movements of the bars 35 (or 135 as the case may be) during the first part of a dispensing cycle, open the closures 90 to receive bands 25 in the present instance. Upon return upward movements of the bars 35 the closures are again moved to the closed position illustrated in FIG. 3.

Figure 10:
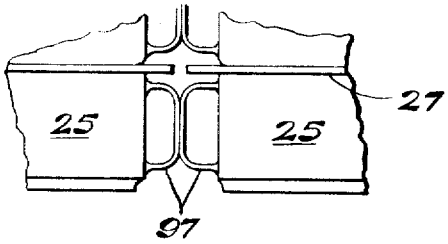
FIG. 10 is a fragmentary side elevational view of pairs of spacing rings in front to rear abutment.

FIG. 10 shows buffer members 97 which may be molded integrally with the bands 25 at their fore and aft surfaces. These buffer formations are provided so that units of one stack moving closely adjacent to stacks forwardly or rearwardly thereof will not catch thereon, even if the elements are inadvertently misaligned.

I claim:

1. Apparatus for supporting a stack of food-containing plates and successively dispensing individual plates from the bottom of said stack, said apparatus comprising means for housing a vertical stack of food plates with spacing members intervening between vertically adjacent plates, the body portions of said spacing members being of less lateral extent than said plates whereby the plate edges project generally laterally beyond said body portions, vertically reciprocal support members disposed at opposite sides of said stack and having supporting portions projecting toward said stack, said spacing members having projections at opposite sides thereof for engagement by said supporting portions whereby engagement of the latter with the lowermost spacing member of a stack supports the stack thereon, a pair of generally parallel supporting rails in said housing at a lower portion thereof spaced to receive and support the edge portions of the lowermost plate of a stack, said rails having openings in registry with said supporting portions to permit free vertical reciprocation of the latter, and means for retracting said supporting portions as they approach the lower ends of their vertical reciprocations and for again projecting the same in the course of their upward reciprocation, whereby said supporting portions lower the stack by engagement with the lowermost spacing member until the plate immediately above such member moves downwardly upon said supporting rails, then retract to permit said spacing member to fall free with the stack supported by said plate, then move upwardly and project during such upward movement to engage the projections of the spacing member above said supporting plate and raise the same and the stack thereabove to free said rail-supported plate for removal.

2. Apparatus for supporting a stack of food-containing plates and successively dispensing individual plates from the bottom of said stack, said apparatus comprising means for housing a vertical stack of food plates with spacing members intervening between vertically adjacent plates, the body portions of said spacing members being of less lateral extent than said plates whereby the plate edges project generally laterally beyond said body portions, vertically reciprocable support members disposed at opposite sides of said stack and having supporting portions projecting toward said stack, said spacing members having projections at opposite sides thereof for engagement by said supporting portions whereby engagement of the latter with the lowermost spacing member of a stack supports the stack thereon, a pair of generally parallel supporting rails in said housing at a lower portion thereof spaced to receive and support the edge portions of the lowermost plate of a stack, and means for retracting said supporting portions as they approach the lower ends of their vertical reciprocations and for again projecting the same in the course of their upward reciprocation, whereby said supporting portions lower the stack by engagement with the lowermost spacing member until the plate immediately above such member moves downwardly upon said supporting rails, then retract to permit said spacing member to fall free with the stack supported by said plate, then move upwardly and project during such upward movement to engaged the projections of the spacing member above said supporting plate and raise the same and the stack thereabove to free said rail-supported plate for removal.

3. Apparatus for supportng a stack of food-containing plates and successively dispensing individual plates from the bottom of said stack, said apparatus comprising means for housing a vertical stack of food plates with spacing members intervening between vertically adjacent plates, the body portions of said spacing members being of less lateral extent than said plates whereby the plate edges project generally laterally beyond said body portions, vertically reciprocable support members disposed at opposite sides of said stack and having supporting portions projecting toward said stack, said spacing members having projections at opposite sides thereof for engagement by said supporting portions whereby engagement of the latter with the lowermost spacing member of a stack supports the stack thereon, a pair of generally parallel supporting rails in said housing at a lower portion thereof spaced to receive and support the edge portions of the lowermost plate of a stack, said rails having openings in registry with said supporting portions to permit free vertical reciprocation of the latter, and means for retracting said supporting portions as they approach the lower ends of their vertical reciprocations and for again projecting the same in the course of their upward reciprocation, whereby said supporting portions lower the stack by engagement with the lowermost spacing member until the plate immediately above such member moves downwardly upon said supporting rails, then retract to permit said spacing member to fall free with the stack supported by said plate, then move upwardly and project during such upward movement to engage the projections of the spacing member above said supporting plate and raise the same and the stack thereabove to free said rail-supported plate for removal, means normally projecting over the edge of a plate disposed on said rails, said projecting means being yieldably movable outwardly from said projecting position to permit free downward movement of a plate to said rails, said projecting means being adapted to prevent raising movement of a plate on said rails whereby raising movement of the spacing member above said plate by said support member projections forcibly separates said plate and said spacing member.

4. Apparatus for supporting a stack of food-containing plates and successively dispensing individual plates from the bottom of said stack, said apparatus comprising means for housing a vertical stack of food plates with spacing members intervening between vertically adjacent plates, the body portions of said spacing members being of less lateral extent than said plates whereby the plate edges project generally laterally beyond said body portions, vertically reciprocable support members disposed at opposite sides of said stack and having supporting portions projecting toward said stack, said spacing members having projections at opposite sides thereof for engagement by said supporting portions whereby engagement of the latter with the lowermost spacing member of a stack supports the stack thereon, a pair of generally parallel supporting rails in said housing at a lower portion thereof spaced to receive and support the edge portions of the lowermost plate of a stack, and means for retracting said supporting portions as they approach the lower ends of their vertical reciprocations and for again projecting the same in the course of their upward reciprocation, whereby said supporting portions lower the stack by engagement with the lowermost spacing member until the plate immediately above such member moves downwardly upon said supporting rails, then retract to permit said spacing member to fall free with the stack supported by said plate, then move upwardly and project during such upward movement to engage the projections of the spacing member above said supporting plate and raise the same and the stack thereabove to free said rail-supported plate for removal means normally projecting over the edge of a plate disposed on said rails, said projecting means being yieldably movable outwardly from said projecting position to permit free downward movement of a plate to said rails, said projecting means being adapted to prevent raising movement of a plate on said rails whereby raising movement of the spacing member above said plate by said support member projections forcibly separates said plate and said spacing member.

5. Apparatus for supporting a stack of food-containing receptacles and successively dispensing individual receptacles from the bottom of said stack, said apparatus comprising means for housing a vertical stack of food receptacles, vertically reciprocable support members disposed at opposite sides of said stack and having supporting portions projecting toward said stack, a pair of generally parallel *horizontal* supporting rails in said housing at a lower portion thereof spaced to receive and support *the lower surfaces of* edge portions of the lowermost receptacle of a stack, said rails having openings in registry with said supporting [portions] *members* to permit free vertical reciprocation of the latter, and means for retracting said supporting portions as they approach the lower ends of their vertical reciprocations and for again projecting the same in the course of their upward reciprocation, whereby said supporting portions lower the stack until the lowermost receptacle moves downwardly upon said supporting rails, then retract and move upwardly and project during such upward movement to engage the stack above said lowermost receptacle and raise the same to free said lowermost rail-supported receptacle for removal.

6. Apparatus for supporting a stack of food-containing receptacles and successively dispensing individual receptacles from the bottom of said stack, said apparatus comprising means for housing a vertical stack of food receptacles, vertically reciprocable support members disposed at opposite sides of said stack and having supporting portions projecting toward said stack, a pair of generally parallel *horizontal* supporting rails in said housing at a lower portion thereof spaced to receive and support *the lower surfaces of* edge portions of the lowermost receptacle of a stack, and means for retracting said supporting portions as they approach the lower ends of their vertical reciprocations and for again projecting the same in the course of their upward reciprocation, whereby said supporting portions lower the stack until the lowermost receptacle moves downwardly upon said supporting rails, then retract and move upwardly and project during such upward movement to engage the stack above said lowermost receptacle and raise the same to free said lowermost rail-supported receptacle for removal.

7. Apparatus for supporting a stack of food-containing receptacles and successively dispensing individual receptacles from the bottom of said stack, said apparatus comprising means for housing a vertical stack of food receptacles, vertically reciprocable support members disposed at opposite sides of said stack and having stack *supporting portions* [engaging members] projecting toward said stack, a pair of generally parallel *horizontal* supporting rails in said housing at a lower portion thereof spaced to receive and support the *lower surfaces of* edge portions of the lowermost receptacle of a stack, said rails having openings in registry with said supporting portions to permit free vertical reciprocation of the latter, and means for retracting said supporting portions after they have moved downwardly past said rail members and for again projecting the same after they have moved upwardly past said rail members.

8. Apparatus for supporting a stack of food-containing receptacles and successively dispensing individual receptacles from the bottom of said stack, said apparatus comprising means for housing a vertical stack of food receptacles, vertically reciprocable support members disposed at opposite sides of said stack and having stack engaging members *with supporting portions* projecting toward said stack, a pair of generally parallel *horizontal* supporting rails in said housing at a lower portion thereof spaced to receive and support the *lower surfaces of* edge portions of the lowermost receptacle of a stack, and means for retracting said supporting portions after they have moved downwardly past said rail members and for again projecting the same after they have moved upwardly past said rail members.

9. Apparatus for supporting a stack of food-containing receptacles and successively dispensing individual receptacles from the bottom of said stack, said apparatus comprising means for housing a vertical stack of vertically reciprocable support members disposed at opposite sides of said stack and having supporting portions projecting toward said stack, a pair of generally parallel supporting rails in said housing at a lower portion thereof spaced to receive and support edge portions of the lowermost receptacle of a stack, said rails having openings in registry with said supporting portions to permit free vertical reciprocation of the latter, and means for retracting said supporting portions as they approach the lower ends of their vertical reciprocations and for again projecting the same in the course of their upward reciprocation, whereby said supporting portions lower the stack until the lowermost receptacle moves downwardly upon said supporting rails, then retract and move upwardly and project during such upward movement to engage the stack above said lowermost receptacle and raise the same to free said lowermost rail-supported receptacle for removal, hold-down members normally projecting inwardly above said rails to engage a receptacle on said rails and prevent upward movement thereof, said hold-down members being movable yieldably outwardly to permit free downward movement of a receptacle to said rails.

10. Apparatus for supporting a stack of food-containing receptacles and successively dispensing individuals receptacles from the bottom of said stack, said apparatus comprising means for housing a vertical stack of vertically reciprocable support members disposed at opposite sides of said stack, a pair of generally parallel supporting rails in said housing at a lower portion thereof spaced to receive and support edge portions of the lowermost receptacle of a satck, and means for retracting said supporting portions as they approach the lower ends of their vertical reciprocations and for again projecting the same in the course of their upward reciprocation whereby said supporting portions lower the stack until the lowermost receptacle moves downwardly upon said supporting rails, then retract and move upwardly and project during such upward movement to engage the stack above said lowermost receptacle and raise the same to free said lowermost rail-supported receptacle for removal, hold-down members normally projecting inwardly above said rails to engage a receptacle on said rails and prevent upward movement thereof, said hold-down members being movable yieldably outwardly to permit free downward movement of a receptacle to said rails.

11. Apparatus for supporting a stack of food-containing receptacles and successively dispensing individual receptacles from the bottom of said stack, said apparatus comprising means for housing a vertical stack of food receptacles, vertically reciprocable support members disposed at opposite sides of said stack and having stack engaging members projecting toward said stack, a pair of generally parallel supporting rails in said housing at a lower portion thereof spaced to receive and support the edge portions of the lowermost receptacle of a stack, said rails having openings in registry with said supporting portions to permit free vertical reciprocation of the latter, and means for retracting said supporting portions after they have moved downwardly past said rail members and for again projecting the same after they have moved upwardly past said rail members, hold-down members normally projecting inwardly above said rails to engage a receptacle on said rails and prevent upward movement thereof, said hold-down members being movable yieldably outwardly to permit free downward movement of a receptacle to said rails.

12. Apparatus for supporting a stack of food-containing receptacles and successively dispensing individual receptacles from the bottom of said stack, said apparatus comprising means for housing a vertical stack of receptacles, vertically reciprocable support members disposed at opposite sides of said stack and having stackengaging members projecting toward said stack, a pair of generally parallel supporting rails in said housing at lower portion thereof spaced to receive and support the edge portions of the lowermost receptacle of a stack, and means for retracting said supporting portions after they have moved downwardly past said rail members and for again projecting the same after they have moved upwardly past said rail members, hold-down members normally projecting inwardly above said rails to engage a receptacle on said rails and prevent upward movement thereof, said hold-down members being movable yieldably outwardly to permit free downward movement of a receptacle to said rails.

13. For use in mechanical dispensing apparatus, food containing means comprising a vertical stack of food containing plates, a spacing, aligning and enclosing member between each pair of vertically adjacent plates, means at the lower end of each of said members for engagement with portions of a subjacent plate for maintaining the member and the subjacent plate against lateral displacement, and means at the upper end of each of said members for engagement with a superjacent plate for maintaining the member and the superjacent plate against lateral dispalcement, said members being generally smaller in lateral extent than said plates, and laterally projecting formations at opposite sides of each member whereby the stack may be supported by means engaging the formations of the lowermost of said members at opposite sides thereof.

14. For use in mechanical dispensing apparatus, food containing means comprising a vertical stack of food containing plates, a spacing, aligning and enclosing member between each pair of vertically adjacent plates, means at the lower end of each of said members for engagement with portions of a subjacent plate for maintaining the member and the subjacent plate against lateral displacement, and means at the upper end of each of said members for engagement with a superjacent plate for maintaining the member and the superjacent plate against lateral displacement, said members being generally smaller in lateral extent than said plates, and spaced pairs of laterally projecting formations at opposite sides of each member whereby the stack may be supported by means engaging the projecting formations of the lowermost of said members at opposite sides thereof.

*15. Means in accordance with claim 13 wherein said spacing, aligning and enclosing members have bumper projections at their remaining two sides projecting beyond said food containing plates whereby adjacent stacks may move relatively vertically in close proximity without interference.*

*16. Apparatus for supporting a stack of articles and successively dispensing individual articles from the bottom of said stack to an underlying support, said apparatus comprising means for housing a vertical stack of articles, vertically reciprocable support members disposed at opposite sides of said stack and having supporting portions projecting toward said stack, each support member being pivoted at a lower portion thereof with its center of gravity outwardly of said pivot with respect to said stack of articles and a stop limiting outward movement of said support member in such position that said support member moves to a withdrawn position with respect to said stack by over-center gravity action, cam means acting on said support member upon predetermined upward movement thereof for projecting said support member toward said stack, said cam means being operable upon predetermined downward movement of said support member to permit the latter to move to its gravity-biased withdrawn position, whereby said supporting portions lower the stack until the lowermost receptacle moves downwardly upon said support, then retract and move upwardly and project during such upward movement to engage the stack above said lowermost receptacle and raise the same to free said lowermost supported receptacle for removal.*

(References on following page)

References Cited

The following references, cited by the Examiner, are of record in the patented file of this patent or the original patent.

UNITED STATES PATENTS

| | | | |
|---|---|---|---|
| 2,089,385 | 8/1937 | Llewellen et al. | 214—8.5 |
| 2,769,570 | 11/1956 | Adams | 221—225 |
| 2,885,111 | 5/1959 | Vann et al. | 221—224 X |
| 2,093,138 | 9/1937 | Riesbeck | 221—88 |

| | | | |
|---|---|---|---|
| 2,702,132 | 2/1955 | Van Doren | 214—8.5 X |
| 2,816,688 | 12/1957 | Wolf | 221—90 X |
| 2,942,734 | 6/1960 | Paddock. | |

FOREIGN PATENTS

| | | |
|---|---|---|
| 1,035,032 | 4/1953 | France. |

SAMUEL F. COLEMAN, *Primary Examiner.*

H. S. LANE, *Assistant Examiner.*